Sept. 20, 1971  F. F. ERDELY  3,606,293
METHOD AND APPARATUS FOR PURIFICATION OF MOLTEN METAL
Original Filed March 29, 1966  4 Sheets-Sheet 1

FIG. 1.

INVENTOR
FRANK F. ERDELYI
Fred Winrall
ATTORNEYS.

Sept. 20, 1971  F. F. ERDELY  3,606,293
METHOD AND APPARATUS FOR PURIFICATION OF MOLTEN METAL
Original Filed March 29, 1966  4 Sheets-Sheet 2

FIG. 2.

INVENTOR
FRANK F. ERDELYI

Fred Wimott

ATTORNEYS.

Sept. 20, 1971  F. F. ERDELY  3,606,293
METHOD AND APPARATUS FOR PURIFICATION OF MOLTEN METAL
Original Filed March 29, 1966  4 Sheets-Sheet 3

FIG. 3.

INVENTOR
FRANK F. ERDELYI

Fred Winiott

ATTORNEYS.

Sept. 20, 1971  F. F. ERDELY  3,606,293
METHOD AND APPARATUS FOR PURIFICATION OF MOLTEN METAL
Original Filed March 29, 1966  4 Sheets-Sheet 4

FIG. 4.

INVENTOR
FRANK F. ERDELYI

Fred Wimott

ATTORNEYS.

United States Patent Office 3,606,293
Patented Sept. 20, 1971

---

3,606,293
METHOD AND APPARATUS FOR PURIFICATION OF MOLTEN METAL
Frank F. Erdely, Raleigh, N.C., assignor to
Walter Sieckman, Allegheny County, Pa.
Original application Mar. 29, 1966, Ser. No. 538,296, now Patent No. 3,508,743, dated Apr. 28, 1970. Divided and this application Sept. 29, 1969, Ser. No. 871,143
Claims priority, application Switzerland, Apr. 2, 1965, 4,617/65
Int. Cl. C21c 7/00
U.S. Cl. 266—34V
11 Claims

ABSTRACT OF THE DISCLOSURE

This disclosure relates to the purification of metals. It more particularly refers to the degasification of metals and especially to such metal degasification from metals which are molten.

---

This application is a division of copending application Ser. No. 538,296, filed Mar. 29, 1966, now Pat. No. 3,508,743, issued Apr. 28, 1970.

Exemplary of metals which can be purified according to this invention is steel. This invention will be described with reference to steel purification, it being understood that the invention is applicable to purification of other metals.

It is usual for steel to contain dissolved gases in form of dissolved iron oxide, hydrogen and nitrogen as well as solid or liquid impurities in the form of suspensions or emulsions in form of oxide inclusions, sulphides and other non-metallic components. The purpose of degasification is to reduce the amount of impurities and gases dissolved in the melt. It is particularly important that the oxygen content of the melt be lowered by decreasing the amount of dissolved iron oxide as well as by reduction and/or elimination of oxide inclusions.

It is in the prior art to degas molten metals by exposure to vacuum, thereby reducing the oxygen content via formation of carbon monoxide. It is a well known principle that chemical reactions involving a gas phase are pressure dependent, i.e., such reactions can proceed to lower end concentrations, when the pressure at the reaction interphase is correspondingly low. Such gas evolution in the form of carbon monoxide bubbles not only causes a reduction in oxygen, but hydrogen and nitrogen as well, particularly since carbon monoxide bubbles act as a "carrier" for hydrogen and nitrogen. The partial pressure of hydrogen and nitrogen in a carbon monoxide bubble is extremely low, thereby allowing such gases to diffuse into the bubble and, hence, be carried out of the system thereby.

Such gas evolution can lead to very low oxygen equilibrium levels, whereby even solid or liquid oxide suspensions ($SiO_2$, $MnO$, $Cr_2O_3$, etc.) are caused to be reduced. In addition, the turbulences from such gas evolution can cause the coagulating and flotation of oxide inclusions such as $Al_2O_3$, otherwise not readily reducible due to their very low oxygen dissociation pressure.

Several processes and apparatus have been proposed for the degassing of molten steel. Such degassing action can take place by exposing the molten metal in a refractory lined container, otherwise known as ladle, to a reduced pressure, or, in order to increase the surface area for the molten metal exposed to the vacuum, by utilizing the metal movement during "free fall," for instance, from a melting furnace into a ladle or from one ladle into another. Still another principle is based on the metal transport from a container, or ladle, into an evacuated chamber where degassing can take place; such transport utilizes the pressure difference between atmosphere and the degassing chamber in order to create a barometric column of molten metal, thereby causing the metal to recirculate between the container and evacuated chamber by a corresponding mechanical movement of either the container or degassing chamber.

All of the above methods have been known to have inherent disadvantages: When exposing the entire ladle contents to vacuum, a relatively small surface area is directly exposed to the low pressure, thereby severely limiting the degassing reaction. Utilizing "free fall" means a relatively short exposure time during which the degassing reactions must take place, again posing a serious limitation. Since the free fall distance is relatively short, only fractions of seconds are available for the actual degassing process. In order to overcome this difficulty of short contact time, it has been proposed to serially connect a plurality of vacuum chambers to increase the degassing time. While this would seem to be a solution to this problem, it has been found that this is not so, since each of the serially connected vacuum chambers has problems associated with the structure thereof. For example, the structural height that is required and the sealing of the vacuum chambers prove to be extremely difficult problems.

It has been found that an effective degassing of molten metal is possible only with a relatively high vacuum, i.e., 1 mm. Hg or less, preferably 0.1 mm. Hg and less. Also, for good surface exposure of the melt, the stream, i.e., during "free fall," should be resolved into individual droplets, the diameter of which is in the millimeter range. As known, the liquid stream entering into a low pressure region, explodes into droplets. The degree of "atomization" and furthermore the control thereof is very difficult to achieve.

When applying the last described technique, i.e., using an evacuated chamber of a bell-like construction, an improvement in the exposure time can be obtained. This improvement, however, is somewhat offset by a decrease of degassing effectiveness caused by the ferrostatic pressure of the steel portion in the chamber impeding the gas evolution in the lower portions thereof. In addition, the limited extent of the barometric column required to transfer the molten metal from the ladle into the evacuated chamber and back, presents a serious problem. This column height is about 145 cm. as it corresponds to the difference in atmospheric pressure and the pressure inside the vacuum chamber. This means that this height practically represents the difference between the metal level in the ladle and the metal level in the evacuated chamber.

By selecting a chamber diameter smaller than the ladle diameter, it is possible for the vacuum chamber to come extremely close to the metal level in the ladle, only limited by the temperature radiation of such metal and heat effects on the exterior chamber material. This means that in such optimum case the maximum filling height in the evacuated chamber, approximately 1 meter, can be obtained. Since, however, the chamber diameter has to be kept small in reference to the ladle diameter, only a small portion of the molten metal can be transported into the degassing chamber, for instance about $\frac{1}{16}$ of the ladle contents. This means that the degassing process has to proceed with numerous small cyclic steps, for instance about 16, in order to expose the total ladle contents once to the vacuum, in reality, however, 50 to 60 cycles are used in order to obtain a several-fold recirculation of the molten metal which has been found necessary for good degassing effects.

Such repeated, incremental recycling, however, is limited by the excessive temperature loss of the molten metal during vacuum treatment. In an attempt to obtain larger steel portions into the evacuated chamber, the chamber diameter was known to be increased beyond the ladle diameter. It would be ideal to degas effectively the total ladle contents in one step by only keeping a small residual amount of molten metal in the ladle in order to maintain vacuum. For example, using a 50-ton ladle which is relatively small for steel mill operations, a vacuum chamber diameter of over five (5) meters would be required. Excessive construction difficulties, capital cost and refractory lining problems prohibit the pratcical use of such proposed solution.

Still, with the chamber diameter somewhat larger than the ladle diameter, it is of vital importance that the ladle is always properly filled, since each reduction in ladle filling height means a corresponding decrease in the filling height of the degassing chamber and, hence, an increase of degassing time which, as previously described, is limited due to the molten metal temperature loss during degassing. In day-to-day steel mill operation, however, ladle filling heights are impossible to guarantee and are dependent upon ladle refractory wear, rolling mill schedule, furnace refractory wear, furnace charge, operator control, etc.

Another problem with practically every known method of degassing is the severe temperature loss of molten metal during the degassing procedure. Much lower final gas levels and better process utilization by virtue of large alloying additions to the melt could be realized by employing heat input during degassing. Such heat input should be sufficient to at least offset temperature loss during degassing and preferably should provide an additional increase in temperature.

Methods such as resistance heating, arc heating, inductive heating, etc. have been developed and tried, but all of these have been found to be unable to supply sufficiently high power input within the short duration time of the degassing process, for instance, not to exceed 30 minutes, coupled with a reasonable capital expenditure, to be of practical use. Inductive heating of, for instance, 2,000 to 3,000 kw. power input would be a feasible method, provided enough material could be forced into the evacuated chamber in a given portion to make inductive heating of such portion feasible from a technical and economical point of view.

In addition, as previously outlined, surface exposure is of vital importance for optimum degassing results. By selecting a proper frequency for the heating, inherent bath stirring results, allowing vigorous metal agitation, beneficial for metal exposure and alloy additions.

Another shortcoming of the last described technique is the necessity of providing mechanical and electrical equipment for a short time cyclic movement of either the ladle or the degassing chamber in numerous repeated steps throughout the degassing operation. Such machinery is complicated, represents a maintenance item, and is of considerable capital expense.

It is therefore an object of this invention to provide a novel method of purifying metal.

It is another object of this invention to provide a novel method of degasifying molten metal.

It is a further object of this invention to provide a novel method of continuously degasifying molten metal.

It is a still further object of this invention to provide a process for sequentially purifying and forming molten metal.

It is still another object of this invention to provide a novel metal purification apparatus.

It is still another object of this invention to provide apparatus in which the methods and processes of this invention can be carried out.

A still further object of this invention is to simultaneously heat and purify molten metal.

Other and additional objects of this invention will become apparent from a consideration of this entire specification, including the drawings and the claims appended hereto.

In accord with and fulfilling these objects, this invention comprises the degasification and purification of metal, particularly molten steel, which is highly effective, takes a relatively short time, employs equipment having a relatively low capital cost and is quite simple to operate. In addition, the molten metal being degassed may be heated, agitated and alloyed at the same time, if necessary or desirable.

In one of the broad aspects of this invention, purification and degasification of molten steel is effected by providing two chambers under differential pressure sufficient to cause molten steel to flow from one chamber to the other via a conduit and introducing into the conduit a purging gas, air, inert gas or reactive gases, whereby the steel melt is degassed and purified in the downstream chamber. Suitably, the downstream chamber is operated under vacuum such that at least part of the pressure differential is provided thereby. Suitably sized heating means are provided, based on either inductive or resistance heating principles on the communicating conduit or preferably on the downstream vacuum chamber to at least offset the inherent temperature loss during degassing.

Understanding of this invention will be facilitated by reference to the accompanying drawings, in which.

The conduit between the upstream and downstream chambers according to this invention is hermetically sealed to both chambers with respect to the environment of the total apparatus, and the inside thereof communicates only with these chambers and the source of purge gas. The purge gas is introduced into the conduit in a part thereof, wherein molten metal is ascending into the downstream chmaber, but whereat such metal is under superatmospheric pressure.

Because of the hermetic connection between the two chambers and the conduit, any change in the equilibrium between the chambers causes a flow of metal from the feed chamber to the vacuum chamber. Only the purging gas is introduced within this hermetic conduit at a point where the molten metal is still under pressure, but is already in the ascending limb, that is, not at the lowest point in the communicating conduit. Introduction of the purge gas at the lowest point of the conduit or in a downward leg thereof must be avoided in order to prevent the molten metal from being purged contrary to the direction of feed, thus interfering with the feed.

The purge gas, in entering the ascending limb of the communicating conduit, reduces the specific gravity of the purge gas-molten metal mixture, so that the molten column additionally rises slightly. The fact that the purge gas is introduced into a hermetic connection between the two chambers assures that all of the purge gas enters the vacuum chamber only. It also provides for movement of the molten metal and purge gas in the same direction. Despite the fact that the purge gas enters the molten metal at a point where the latter is still under an overpressure, the purge gas will immediately expand merely due to the reduction of the specific gravity of the molten metal and accordingly increase its area, whereby its action on the metal is improved. This expansion of the purge gas continues as the purge gas rises upward and finally comes into the vacuum area, because the pressure in the metal column is continually decreasing as the effective column height reduces. It expands increasingly until finally, at the surface of the metal in the vacuum chamber, it is exhausted into the vacuum source.

In this manner, a complete utilization of the purge gas is achieved. This complete utilization is extremely desirable in order to achieve a complete purification of the metal and to keep within the capacity of the vacuum source. This process has the additional advantage that the dimensions of the vacuum chamber remain small and that the vacuum and feed chambers do not move in relation to one another during the vacuum treatment.

In one embodiment of the invention, the equilibrium of the molten metal between the two chambers is varied by exerting a superatmospheric pressure on the surface of the metal in the feed (upstream) chamber, suitably by means of a gas, while maintaining the vacuum in the vacuum chamber, and augmenting the pressure as the metal is advanced from the feed chamber to the vacuum chamber. A simple adjustment in the pressure level is all that is necessary to control the metal height, portion and exposure time in the vacuum chamber. This process is performed to special advantage by exerting the overpressure on the surface of the metal in the feed chamber by means of the purge gas. In this procedure, the vacuum chamber with the conduit is immersed into the feed chamber simultaneously providing an air-tight seal between the feed chamber and the conduit or vacuum chamber. The vacuum chamber is then evacuated to a vacuum of, say, 0.1 torr, this value being mentioned only by way of example, without being considered critical. Pressure, suitably gas pressure, especially pressure provided by the purge gas, on the surface of the molten metal in the feed chamber is adjusted so that a velocity of flow is established in the ascending limb of the communicating conduit. A suitable flow rate might be 1.5 m./s. If the lining is improved, the speed can, of course, be increased, the important thing being only that any speed of flow considered expedient can be set in the ascending limb of the communicating conduit by adjusting the pressure on the surface of the molten metal in the feed chamber. This pressure on the surface of the molten metal in the feed chamber accordingly need not initially be a superatmospheric pressure, but may be, if desired. During the degassing operation, this pressure is superatmospheric.

By adjusting the degree of gas pressure (air, inert, or reactive gases) any desired molten metal portion is forced from the feed chamber into the vacuum chamber to any desired height, a height, for instance suitable enough to energize an inductive heating coil incorporated into the chamber side walls, thereby heating the molten metal in the vacuum chamber for the length of time it is supported by the overpressure above the feed chamber metal level. Similarly, inductive bath stirring can be accomplished, alloy additions can be made, etc.

Also, initially, a small bath depth can be chosen, i.e., a relatively small steel portion can be forced into the feed chamber in the early stage of degassing. This might be beneficial in order to control any possible excessive outgassing and also, from the point of optimum degassing efficiency, i.e., not to limit the early gas evolution by any excessive ferrostatic pressure in the lower zones of the metal portion. Later, this portion can easily be increased for heating and/or alloying additions, shortening of degassing time, etc.

Also, aside from inductive stirring in the vacuum chamber, severe metal agitation beneficial for optimum degassing, can also be obtained expediently by allowing part of the purge gas to enter into the feed pipe via suitably sized openings as the metal level in the feed chamber receeds to a point where such entry is possible.

As described previously, such purge gas would expand correspondingly to its rise in the pipe and upon entering the vacuum chamber attribute significantly to bath agitation and surface area exposure of the molten metal under vacuum. It is expedient to begin with a gas pressure that is approximately equal to atmospheric pressure and then gradually increase the gas pressure dependent upon the desired portion of metal in the vacuum chamber. It must be remembered that, while nearly all molten metal in the feed chamber can be forced into the vacuum chamber in one step, some should preferably remain in the feed chamber in order to cover the bottom of the conduit so that there exists no danger of breaking vacuum in the vacuum chamber during degassing operation.

Basically this needs to be done only once or twice, because, during the single transportation of the molten metal, almost the entire heat can be purified and degassed. It is also possible, although generally unnecessary, to recycle the metal from the downstream chamber back into the feed chamber by reversing the pressure differential in both chambers or by external piping or other means, and then to repeat the process. Likewise, it is possible, without departing from the invention, to advance only a portion of the metal heat by the method described from the feed chamber into the vacuum chamber, draw this part of the heat back from the vacuum chamber into the feed chamber by reducing the purge gas pressure, whereby the metal flows back into the feed chamber, and repeat this process two or three times. A substantial improvement over the prior art is achieved in this manner, because only a few alternations suffice to bring about the degassing and purification of the entire heat. Even if the process is performed step-wise in the manner thus described, the advantage is obtained that it is possible by acting on the gas overpressure to force a relatively large portion of the heat into the vacuum chamber, on the one hand, and on the other hand, it is possible to bring about the transportation of the metal from the feed chamber to the vacuum chamber in an extremely simple and inexpensive manner, namely by varying the purge gas pressure and the vacuum drawn on the downstream chamber.

This invention can also be practiced by maintaining the vacuum in the downstream chamber substantially constant and varying the equilibrium between the two chambers by drawing off some portion or all of the molten metal on the downstream side at a point where the metal is under an overpressure, with the effect that metal which is still to be purified flows from the feed chamber into the downstream chamber.

In this embodiment of the process, therefore, the drawing off of the degassed hot metal from the vacuum chamber at a point where the metal is under an overpressure is performed with the effect that fresh metal flows from the feed chamber at the rate at which degassed metal is drawn off. When a certain amount of degassed hot metal is drawn off, the pressure in the vacuum chamber tends to be further reduced, which would result in an increase in the degree of vacuum in the downstream chamber. Since this vacuum in the vacuum chamber is virtually kept constant, a corresponding amount of fresh, unpurified hot metal must flow in.

In this embodiment of the process, therefore the drawing off of the purified hot metal from the vacuum chamber results in a tendency for the pressure in this chamber to reduce (vacuum to increase). Since the atmospheric pressure on the other side of the communicating connection remains constant, a flow of hot metal results, which runs from the feed chamber to the vacuum chamber and counteracts a reduction of the pressure in the vacuum chamber.

After introducing the purge gas, whereby the molten metal is caused to flow toward the downstream chamber, it is often desirable to reduce the stream velocity without decreasing the quantity of stream flow approximately in the area where the pressure of the metal undergoes a transition from overpressure to underpressure. This can be suitably accomplished by increasing the cross section of the vacuum chamber. Changing the stream velocity in this manner is not per se considered to be inventive, since such appears in the prior art. However, this technique has been found to be particularly advantageous in the practice of this invention. It should be understood that the cross section of the communicating conduit should be relatively small in order to produce a velocity of flow of the hot metal which is relatively high such as to achieve a uniform distribution of the purge gas through the molten metal at minimum expense. But after uniform gas distribution has been achieved, it is expedient to reduce the velocity of flow in the vacuum areas of the vacuum chamber, in order to facilitate the expansion of the purge gas in this chamber under the influence of the vacuum, in order to thereby improve the action of the purge gas on the metal, and lastly, also to make possible a complete removal of the purge gas from the molten metal.

It may be desirable or necessary to heat the molten metal during the vacuum treatment. This is especially true when endothermic alloying additions are made during degassing and/or since degassing is in all practical cases a sequel of a melting operation prior to casting of the degassed molten product at a temperature suitable for this casting, that is high enough above the liquidous temperature of the molten metal to allow proper casting.

One apparatus for the performance of the process of the invention provides a vacuum chamber which can be evacuated and placed in hermetic communication with a feed ladle which is at least under atmospheric pressure. The elevation of the vacuum chamber which is hermetically sealed at the top and can be connected in its upper area with a vacuum source, is adjusted to be higher at least by the column height of the hot metal corresponding to the pressure of one atmosphere than the level of the molten metal in the feed ladle. The actual height of the vacuum chamber should be at least several times the height of the column of molten metal steel portion in the vacuum chamber as supported by the overpressure in the feed chamber in order to contain the violent outgassing during the early stage of vacuum treatment. Means are provided for the introduction of a purge gas under pressure into the limb of the hermetic communication conduit that ascends to the vacuum chamber at a point where the molten metal is under overpressure. Means are provided to increase the purge gas pressure on the feed chamber sufficient to overcome a situation where the vacuum chamber pressure approaches that of the feed chamber.

Where the invention apparatus comprises a feed chamber under pressure hermetically connected to a vacuum chamber through a conduit, provision should be made for the conduit to have its intake point as close to the bottom of the feed chamber as possible in order that there not be an interruption in flow by reason of the level of metal in the feed chamber falling below the level of the conduit intake point. The vacuum chamber should be so dimensioned that it is capable of holding at least a portion and preferably substantially all of the hot metal in the feed chamber, allowing appropriate height for outgassing of metal.

This apparatus is constructed, in a preferred embodiment of the invention, in such a manner that the feed ladle or chamber is movable, especially vertically and is provided with a shoulder extending therearound which can be pressed tightly against a sealing flange of the vacuum chamber such that a hermetic connection by a skirt to the vacuum chamber is made with the purge gas compressor being connected to the skirt. Should, however, any alterations to existing feed chambers be impractical, it can easily be seen that for instance the feed chamber can be placed into a pit with the air-tight pressure hood connected to the vacuum chamber to seal against the pit sides and the vacuum chamber. In an arrangement of this kind, it is particularly easy to fill the feed ladle or teeming ladle with still undegassed molten metal and empty it again after performing the degasification.

This apparatus is constructed in a preferred embodiment of the invention to contain a suitably sized induction coil of sufficient power input and preferably net frequency in the vacuum chamber side walls to allow heating and bath stirring of said steel portion while being supported by the overpressure in the feed chamber.

If the invention is embodied so that the pressure differential between the two chambers and associated sections of the communicating conduit is varied by drawing off degassed and purified molten metal from the vacuum chamber, it is recommended, according to the invention, to construct the communicating conduit as a communicating tube with two ascending limbs and a lower middle portion connecting these two limbs together, one of the two limbs opening into the feed ladle and the other into the vacuum chamber. In this case, the purge gas compressor is connected to the limbs which open into the vacuum chamber in order to introduce the purge gas into the molten metal at a point which lies below the level of the molten metal in the feed ladle at atmospheric pressure. The molten metal exit out of the vacuum chamber is through an outlet which is located below the level of said feed ladle molten metal and may be controlled and shut by means of a shut-off device.

In one expedient embodiment of this apparatus, a metal forming or working device can be included after the main outlet of the downstream or vacuum chamber. The metal forming or working device may be, for instance, a continuous casting die or a roll mill, a tube forming die, etc. Other forming steps as required can follow in ordered sequence as shown in the art.

Another expedient embodiment of this invention resides in the fact that alloying components can be conveniently added to the molten metal in the vacuum chamber during the vacuum treatment, since by the intensive movement and bath agitation due to the influence of the inherent gas evolution, purge gas effect and/or induction stirring, extremely good mixing of the added alloy components with the molten metal results which means homogeneous and segregation-free steel products. The compounds which are known to be deoxidizing agents are especially considered as alloying components; ferromanganese, ferrosilicon and ferrovanadium are mentioned as examples of such agents for molten steel.

As already emphasized in the description, the invention is characterized not only by an especially effective degassing, but also by the fact that the apparatus required for the reduction of the invention to practice, especially the vacuum chambers, become extremely small. By means of the invention, it is easily possible to make several minutes available as residence time for the degassing.

An induction coil is preferably operatively associated with the vacuum chamber in each of the embodiments of this invention.

This invention will now be described with reference to the drawings.

Figure 1:
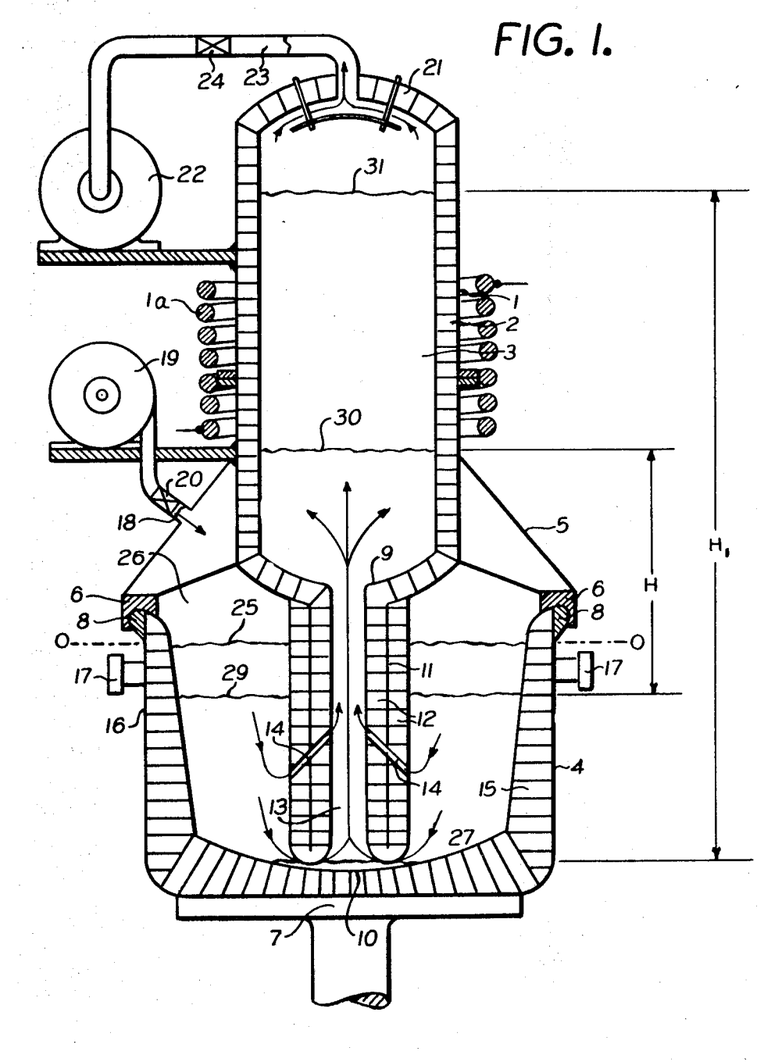
FIG. 1 is an elevation partially in section of an apparatus according to this invention.

The apparatus of FIG. 1 consists substantially of a vacuum chamber 3 equipped with a metal jacket 1 and a lining 2, and a teeming ladle 4 or a feed reservoir 35. The vacuum chamber 3 is equipped in its lower portion with a hermetic skirt 5 made, for example, of steel plate, which has a marginal seal 6 on its periphery and radially overlaps the teeming ladle 4. The teeming ladle 4 is mounted on a lift platform 7 and can be pressed by the latter with its marginal thickening 8 against the marginal seal 6 of the skirt 5, thereby producing a hermetic seal between the vacuum chamber 3 and the teeming ladle 4. The vacuum chamber 3 has in the vicinity of its bottom portion 9 a tubular suction nozzle 11 extending close to the floor 10 of the teeming ladle, the said nozzle having brickwork 12 and an aspirating passage 13 extending through its entire length. There are openings 14 in the suction nozzle 11 in the bottom area facing the teeming ladle floor 10.

The teeming ladle 4 is provided with brickwork 15, and trunnions 17—17 are provided on its jacket 16, the said trunnions being engageable by transporting and tipping apparatus which are not shown.

In the skirt 5 which provides the hermetic coupling between the vacuum chamber 3 and the teeming ladle 4 there is provided a passage 18 which is connected to a blower or compressor 19 in order to feed purge gas at elevated pressure, and a valve 20 for regulating the purge gas pressure. In the roof 21 of the vacuum chamber 3 there is provided a passage 23 connecting it to a vacuum source, such as a vacuum pump or a diffusion pump, and a shut-off device 24 is provided in the said passage.

The teeming ladle 4, which is normally filling up to the line 0—0, is pressed by means of the platform lift 7 with its marginal thickening 8 against the seal 6 matching the marginal thickening, thereby producing a hermetic seal and hence a pressure chamber 26 between the vacuum chamber 3 and the radially flaring skirt 5. With valve 20 closed, the vacuum source 22 communicating through passage 23 with the vacuum chamber is started up, and the interior of vacuum chamber 3 is evacuated to, for example, 0.01 torr by opening the shut-off valve 24. The atmospheric pressure enclosed in pressure chamber 26 produces a pressure equalization in such a manner that molten metal flows through the bottom opening 27 in the suction nozzle 11, through its suction passage 13 and opening 27 in the bottom 9, into the interior of the vacuum chamber, until a complete pressure equalization is brought about between the molten metal column H, including the vacuum in the vacuum chamber, and the pressure present in the compression chamber 26. The new level of molten metal in the teeming ladle is designated as 29, while the new level that is simultaneously produced in the vacuum chamber bears the reference number 30. Then, as a result of the evacuation of the interior of the vacuum chamber above the molten metal, gas is evolved from the molten metal.

Then valve 20 is opened and purge gas is pumped into pressure chamber 26 under elevated pressure by means of a compressor 19. As pressure builds up in the pressure chamber 26, additional molten metal is forced through passage 13 of suction nozzle 12 into the vacuum chamber 3. As a result of the resultant lowering of the molten metal level in the teeming ladle, passages 14 in the bottom half of the suction nozzle become exposed. Purge gas then flows from the pressure chamber 26 through openings 14 into the molten metal in the passage 13 of the suction nozzle 11 and causes the metal to be thoroughly agitated. The passages 14 have only a small and limited cross section. The amount of purge gas that enters into the molten metal is continuously exhausted by the vacuum source 22 connected to passage 23, although the vacuum source sbstantially maintains the vacuum in the vacuum chamber 3. By further pressure increase in the pressure chamber 26, practically the entire heat is pumped into the vacuum chamber and treated with the purge gas continuously flowing through openings 14, and it is therefore effectively degassed and purified. The purge gas pressure in the pressure chamber 26 must in this phase be proportional to a column height corresponding to H–1, the level of the molten metal in the vacuum chamber being designated as 31. Metal circulation for repeated exposure to vacuum can preferably be effected by reducing the purge gas pressure in the pressure chamber 26, causing the metal portion in the feed chamber 3 to return to the teeming ladle 4 via passageway 13, for instance, from a level 31 to 30. It is also possible that during the final phase of the process purge gas also flows through the entrance 27 of the suction passage 13 of the suction nozzle, and thus leads to a reduction of the vacuum in that portion of the interior of vacuum chamber 3 which is not filled with molten metal, resulting in a limited backflow of the metal until the entry-way 27 of suction passage 13 is closed. The evacuation of the vacuum chamber interior which is again performed by the vacuum pump results in a repeated pumping of the metal into the vacuum chamber, resulting in an effective agitation of the metal, and the above-described process is intensified. This process could be continued for any desired length of time, provided that the metal is maintained in the molten condition. The molten condition may be maintained by heating, especially by inductive heating which is preferred. By eliminating the vacuum in the vacuum chamber, the return of the hot metal from the vacuum chamber is completed and thus the degassing and purifying process of the invention is terminated. The teeming ladle can then be lowered, along with the degassed and purified molten metal, by means of the platform lift 7.

The openings 14 for the introduction of the purge gas into the molten metal are thus located in an area in which the metal is under an overpressure. The evacuating of the vacuum chamber 3 and the pressurizing of the pressure chamber 26 are regulated by means of valves 20 and 24 of the vacuum source 22 and compressor 19 in such a manner that a velocity of flow of the metal is not too high for the brickwork.

The cross section of the vacuum chamber 3 is, in a prior-art manner, substantially greater than that of the suction passage 13. Since the pressure in the pressure chamber 26 and hence the height M–1 of the molten metal can be made as great as desired, the cross section in both the teeming ladle 4 and the vacuum chamber 3 can be very small.

Among the numerous possibilities for variations, particular mention will be made of the possibility of having the vacuum chamber fixedly and hermetically coupled with the teeming ladle. The teeming ladle then needs only to be equipped with throttleable systems for feeding in the unpurified molten metal and carrying out the purified metal. The above-described embodiment makes possible only an especially simple and rapid filling and emptying of the teeming ladle, a plurality of teeming ladles being able to cooperate successively with one vacuum chamber, if desired.

Figure 2:
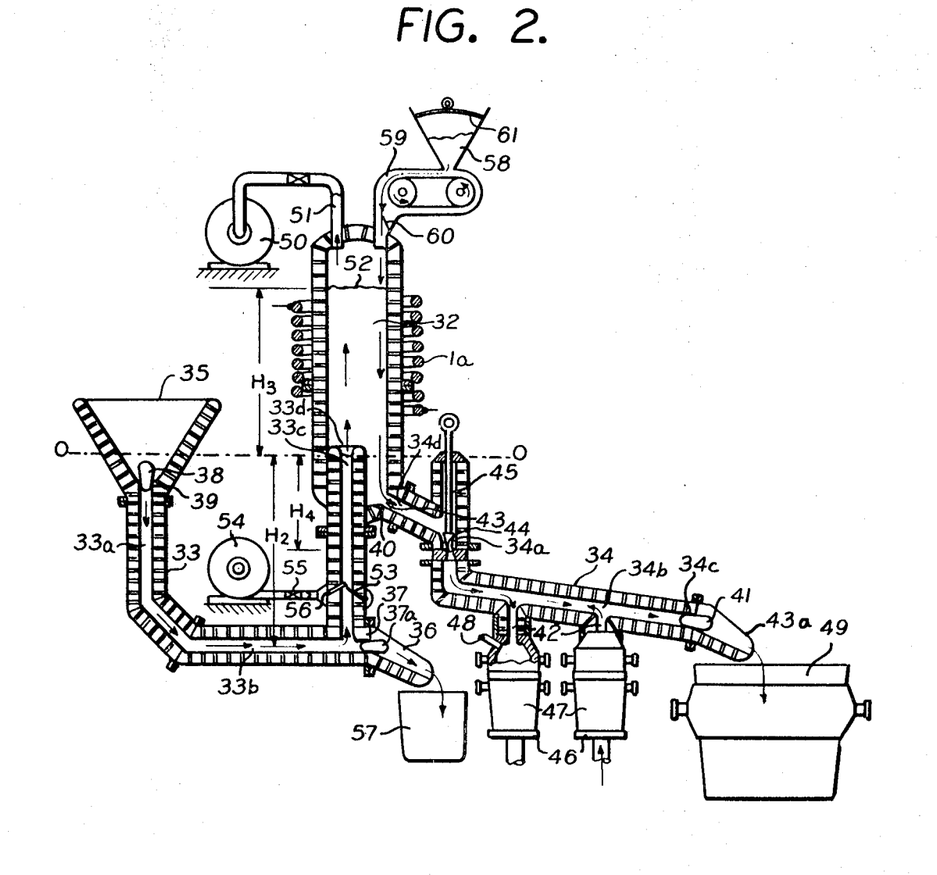
FIG. 2 is an elevation partially in section of another apparatus according to this invention.

The embodiment of the apparatus according to FIG. 2 serves for the continuous performance of the degassing and refining process of the invention. The apparatus consists substantially of a vacuum chamber 32, a feeding system 33 and a drawing-off system 34. The vacuum chamber 32 is substantially similar in construction to the vacuum chamber 3 of FIG. 1. The feeding system consists of a feeding or reservoir ladle 35 and a tube 33 for feeding the molten metal to be refined from the reservoir ladle 35 to the vacuum chamber 32. The feed tube 33 is constructed in a U-shape in the manner of a commuincating tube, and consists of two limbs 33a and 33c, each of which is open at the top, and a substantially horizontally disposed middle portion 33b. Limb 33c empties at opening 33d into the bottom third of the vacuum chamber 32 at about the same height as that of the conduit opening into the reservoir ladle 35. The connecting passage 33 is equipped in the area of its horizontally disposed middle portion 33b with an outlet 36 which can be shut off by means of a shut-off member 37, 37a. A shut-off member 38, 39, is disposed in the reservoir 35 for the interruption of the continuous feeding of molten metal.

The drawing-off system 34 consists substantially of an outlet opening 43 below the bottom 40 of the vacuum chamber 32, which merges into a pouring passage 34a and an extension passage 34b running substantially horizontally, with an outlet opening 34c, which can be closed by a shut-off member 41, and which empties into a pouring spout 42. An opening 43 provided in the bottom 40 of the vacuum chamber 32 is connected by a downwardly slanting pouring passage 34d to the outlet opening 44, which can be closed by means of a shut-off member 45 to interrupt the flow of molten metal which normally flows continuously from the vacuum chamber. The pouring passage 34d extending to the outlet opening equipped with the shut-off member 45 is disposed below the outlet opening 33d of the connection passage 33 which serves as a communicating tube to connect the reservoir ladle 35 to the vacuum chamber 32 and extends downward slantingly from its inlet opening 43 to the outlet opening 44. The pouring spouts 42 on the extension passage 34b are likewise equipped with shut-off members (not shown) and can be connected hermetically to chill moulds 47 which can be moved by platform lifts 46. Tubes 43 can be disposed on the moulds 47 to provide a connection to vacuum sources through shut-off valves. A teeming ladle 49 is located underneath the outlet opening 34c.

If the reservoir ladle 35 is filled with molten metal, and shut-off member 38–39 is opened, the molten metal runs through the connecting passage 33 into the lower area of the vacuum chamber 32. A position of equilibrium will establish itself in the U-shaped passage 33, corresponding approximately to the line 0—0. If, in the same manner as in FIG. 1, the interior of the vacuum chamber 32 is evacuated through a vacuum line 51 connected to a vacuum source, a pressure differential develops between the interior of the vacuum chamber 32 and the reservoir ladle 35 which is under atmospheric pressure, thus causing additional molten metal to be forced out of the reservoir ladle 35 into the vacuum chamber to the level 52. If the vacuum chamber is evacuated to about 0.01 torr, for example, the column height (H–3) of molten steel forced into the vacuum chamber will amount to about 1.45 m. The equilibrium line 0—0 is expediently located at a height (H–2) which is higher than or equal to about 1.6 m. above the horizontally disposed middle portion 33b of the feed passage 33. The shut-off member of the pouring passage 34, and also the opening 43 in the bottom 40 of vacuum chamber are disposed lower than the equilibrium line 0—0. If the shut-off member 45 located lower by the column height (H–4) than the equilibrium line 0—0 is opened, the refined and degassed molten metal flows along the line indicated by the arrows in FIG. 2 from the vacuum chamber 32 through the pouring passage 34d and the outlet opening into the pouring passage and into the extension passage 34b, and is advanced either through the teeming spouts 42 into the chill moulds 47 or through the outlet opening 34c into the teeming ladle 49. To accelerate the speed of flow in the case of chill-mould casting, the chill moulds can be evacuated through the vacuum line 48.

A purge gas is fed through conduits 53, which conduits are of limited cross section, to the molten metal flowing from the reservoir ladle 35 to the vacuum chamber in the ascending limb 33c of the connecting passage 33 and in the area of column height H–2 in which the molten metal is under overpressure, the said conduits being connected to a compressor 54 through a passage 56 than can be shut off by means of a shut-off valve 55.

The degassing and refining process to be performed with the apparatus of FIG. 2 can expediently take place continuously. The reservoir ladle 35 can be supplied from one or a plurality of Bessemer, open-hearth and other furnaces. The process can be set up in such a manner that the degassing of a heat can be performed in the interval between two furnaces heats. Interruptions of the continuous process are made possible by means of the shut-off devices 39 and 45. In the performance of the process, the untreated molten metal fed to the vacuum chamber through passage 33 first flows upwards in the vacuum chamber, then turns about in the vicinity of the surface 52 of the metal and flows downward, whereupon its still undegassed part is turned about and driven back upward by the molten metal emerging from the opening 33d. The degassed part of the hot metal flows through the opening 43 and passage 34 to the outlet opening 44 which is opened more or less widely by means of the shut-off device 45. The degassed part of the molten metal has a greater specific gravity than the non-degassed part, and this promotes the above-described flow. All of the molten metal is thus carried into the upper area near the surface and kept constantly in movement. Therefore, an effective degassing and purification of all of the metal is performed, and the degassing is not hampered due to appreciable ferrostatic pressure on the bottom portion of the hot metal.

The feeding in of purge gas improves the effectiveness of the process of the invention and accelerates it.

The installation described with reference to FIG. 2 is set in operation by pouring the molten metal into the feed chamber while the vacuum chamber is still not under a vacuum. If the shut-off device 39 is opened, the molten metal then stands in the limbs of the communicating tube at the height H–2 in FIG. 2, that is, at height zero. Now the vacuum pump 50 is turned on, causing the molten metal in the vacuum chamber to rise to the height H–3. The purge gas is fed in at about the same time that the vacuum pump is turned on. Then such amount of molten metal which is resident in the vacuum chamber is degassed and treated. The vacuum pump 50 or the diffusion pump draws out the purge gas that is pumped in, while maintaining the vacuum constant. After the molten metal in the vacuum chamber has been sufficiently degassed in this manner, the tapping valve is opened so that the speed of flow of, for example 1.5 m./sec., if that is considered proper, is again established in the ascending limb of the communicating tube. The molten metal now flows continuously through the apparatus at the stated velocity, while it is continuously purged and degassed.

The column height H–3 of the molten metal, plus the small pressure head corresponding to the overpressure in the vacuum chamber 32, is therefore equal to the gas pressure exerted on the surface of the molten metal in the reservoir ladle. If this gas pressure is equal to the atmospheric pressure, H–3 is approximately equal to 1.45 m. in the case of molten steel. It is, however, also possible according to the invention to apply an overpressure to the molten metal in reservoir ladle 35 by means of a gas. The column height H–3 is then correspondingly higher.

Below the line 0—0, the molten metal is under a pressure which is greater by the column height than the pressure which the molten metal has on line 0—0. So, if the molten metal is under atmospheric pressure on this line, it is under an overpressure below the line 0—0. In the case of a molten steel with H–2 $\geq$ about 1.4 m., an overpressure will therefore prevail in the horizontal portion 33b of something over 1 atmosphere.

In the overpressure area of the column height H, both the outlet opening 44 with the pouring passage 34 of the vacuum chamber 32 and the openings 53 for the introduction of the purge gas must be located. Heights (H–2) of at least about 1.5 m. for a steel bath and corresponding heights for other materials having different specific gravities are preferred for reasons of safety. Such column height could be lower, but in any event should always be greater than the equivalent of about one atmosphere.

In the middle portion 33b of the connecting passage 33, that is, at its lowermost point, there is provided an outlet opening 37 which can be closed by means of a blocking means 37a, which outlet opening empties into an outlet spout 36. The outlet opening 37 is provided in order to drop the molten metal into a reservoir ladle 35 whenever the degassing process is to be interrupted. Instead, the molten metal in the passage 33 and the ladle 35 can also be forced to the outlet opening 44 by means of a gas overpressure acting on the molten metal in the ladle 35.

During or after the degassing of the molten metal in the vacuum, it may also be recommendable to add alloying substances. For this purpose, according to the embodiment in FIG. 2, a hopper 58 empties into the upper part of the vacuum chamber 32 through a conduit 59 into which a shut-off valve is inserted. The hopper 58 can be filled through a shut-off device 61 with any desired alloy components, deoxidants or other additives. After cover 61 has been closed and the valve 60 has been opened, the alloy components, deoxidants or other additives enter into the molten metal and are there intensively mixed with the molten metal by the intensive movement of the latter and the bubbling gas passage therethrough.

While in the embodiment in FIG. 2 the additives are continuously added to the molten metal as the continuous purification process goes on, the alloying components or deoxidants of the embodiment in FIG. 1 can be fed in as a single batch for the entire volume of the heat. In FIG. 1, the hopper and the corresponding apparatus for the addition of the alloy components deoxidants or other additives have been omitted for the sake of simplicity.

Under the assumption that atmospheric pressure prevails on the surface of the molten metal in the reservoir ladle 35—in other words, the line 0—0 represents the atmospheric pressure—the molten metal at the tapping orifice 44 is under the overpressure of the column height of H–4. If accordingly the molten metal flowed into the open air at this point (in variation of the representation in FIG. 2), the velocity of its flow due to the overpressure would be determined by the overpressure corresponding to the column height H–4, plus the flow losses, particularly in the opening 44, which depend mainly on the setting of the shut-off member 45.

If, in accordance with the representation in FIG. 2, the degassed molten metal is first drawn off through the outlet opening 44–34c, a higher overpressure will be created in the molten metal at this point, corresponding to the distance between outlet opening 44–34c and the line of equilibrium 0—0.

The resistances in the passages 33, 34 and 42 and in the valves 39 and 45 must be taken into account with reference to the speed at which the molten metal issues from the opening, in such a manner that the velocity of flow of the metal in the connecting passage 33 will not exceed the desired velocity of flow of, for example 1.5 m./sec.

If the molten metal, after passing through the valve 45, is poured into the chill moulds 47, which have been put under a vacuum by means of the tube 48, this vacuum increases the outflow speed of the metal, which also has to be taken into consideration in determining the velocity of flow within the connecting passage 33.

Figure 3:
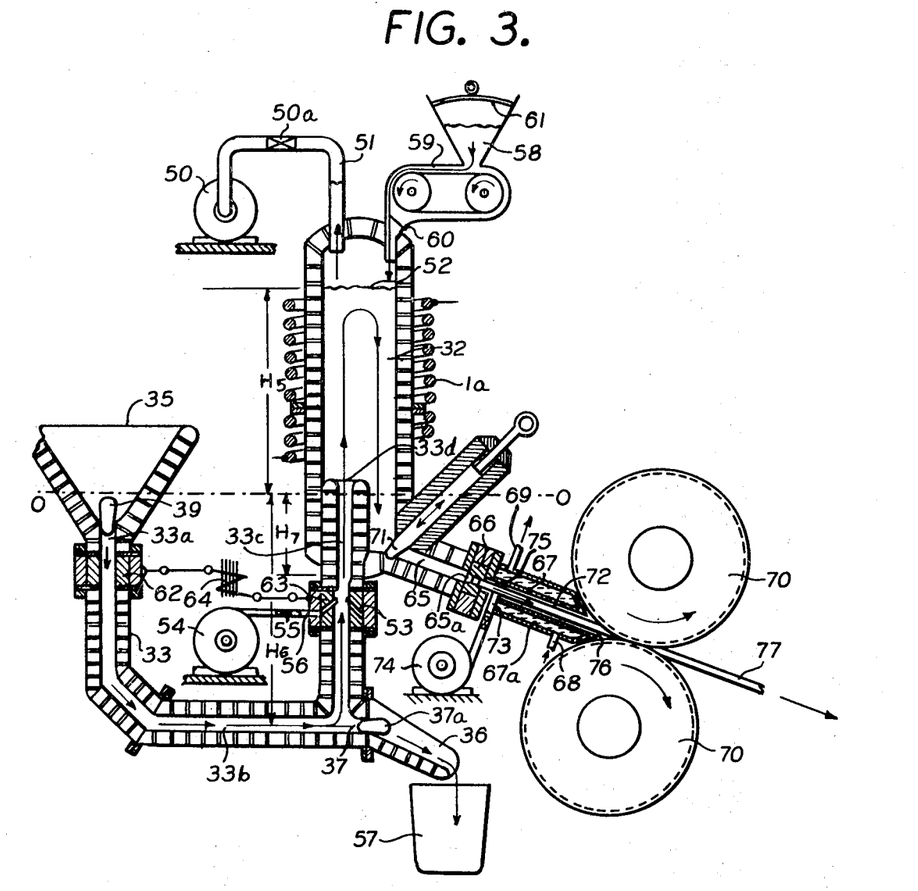
FIG. 3 is an elevation partially in section of the apparatus of FIG. 2 modified to provide for metal working and/or forming after purification.

The embodiment in FIG. 3 differs only in certain details from the embodiment in FIG. 2, so that the same reference numbers have been used for the same parts, and the description of the embodiment in FIG. 3 can be limited to the differences in comparison with FIG. 2. The column heights H–5, H–6 and H–7 of FIG. 3 correspond to the column heights H–3, H–2 and H–4 of FIG. 2.

In the embodiment in FIG. 3, in order to introduce the purge gas in the ascending limb 33c of the feed passage 33, passages 53 are provided which are connected through a conduit 56 equipped with a shut-off member 55 to a compressor 54 for pumping purge gas into the connecting passage 33. Furthermore, in the embodiment in FIG. 3, heating system 62–63 are provided, which may be supplied from a common, centrally located heating source 64 or may be heated individually, and heat the molten metal in passage 33. The heating devices can be constructed especially as resistance heating systems or inductive heating systems. But other heating methods can easily be used, such as heating by the combustion of a combustible material, especially a combustible gas, or heating by means of a previously heated fluid.

The embodiment of the apparatus for the performance of the process of the invention as shown in FIG. 3 differs from the embodiment of FIG. 2 mainly in the area of the tapping system 65. At the end of the tapping passage 65a there is disposed a die 66 through which the emerging metal can be cast into a strand of any desired shape. Instead of the tapping passage 34 of the embodiment in FIG. 2, there is, in continuation of the die 66, a cooling chamber 67–67a, which is provided with a feed conduit 68 and a discharge conduit 69 for carrying a coolant. The strand of material cast in the die 66 is cooled in the cooling chamber to a hot-forming or even cold-forming temperature. For this purpose, a liquid such as water or a gas such as air is passed through the cooling chamber. Particularly for the avoidance of oxidation, the strand of metal can be covered by shielding gas in the cooling chamber area.

At the end of the cooling chamber there is disposed a synchronously driven set of forming rolls 70, which seize the strand of metal emerging from the cooling chamber and subject it to a forming treatment.

A shut-off device is located ahead of the die 66. However, this shut-off device serves mainly for the purpose of initiating the degassing and refining process in accordance with the above description. To this extent, therefore, the function of the shut-off device is the same as that of the shut-off device 45. As soon as the molten metal has been sufficiently degassed in the evacuated vacuum chamber and has been alloyed, if desired the shut-off device 71 is opened as in the case of the embodiment in FIG. 3. The task, however, of regulating the flow of the molten metal from the vacuum chamber 32 according to the velocity of flow of the metal in the connecting passage 33 is then substantially taken over by the die 66. The cross section of the die (which determines its resistance to flow) is to be made such that the velocity of flow produced in the connecting passage 33 in no case exceeds the maximum speed that is recognized as being correct in each case.

The shielding gas enters the interior of the cooling chamber 72 directly behind the die 66 through a passage 73, after it has been compressed by means of a compressor 74. In this manner, the shielding gas can enter the chamber 72 through a distributing ring 75, in order to assure a distribtuion that is as uniform as possible on the inner periphery of the cooling chamber 72. The shielding gas leaves the chamber 72 at a point 76 together with the strand 77. Accordingly, as it leaves the die, the strand is under the influence of an overpressure which the shielding gas has at this point. Under these circumstances, it is possible to influence the speed at which the molten metal is forced through the die 66, by varying the overpressure of the shielding gas.

The two rollers 70 are driven substantially synchronously, in accordance with the speed at which the molten metal is forced through the die, that is, at which the strand 77 is shaped.

This strand is cooled by means of the cooling chamber 67–72 in the embodiment in FIG. 3 only to a temperature that is considered proper for the following process of shaping by means of the rollers 70. Depending on the forming and shaping process that follows, the temperature may be a hot-forming temperature or a cold-forming temperature. The pressure with which the molten metal is forced through the die 66 is determined by the height H–7 in FIG. 3. In other words, it is easily possible, by adjusting the setting of the die 66 with relation to the equilibrium line 0—0, to force the molten metal through the die with any desired pressure: the lower the discharge point, the greater the pressure. This is also relatively easy to achieve constructionwise, since through the invention, the entire apparatus and especially the vacuum chamber 32 can be made very small and with a small cross section. The shielding gas can additionally be used for the cooling of the continuous casting die and of the strand 77 emerging from the said die.

Figure 4:
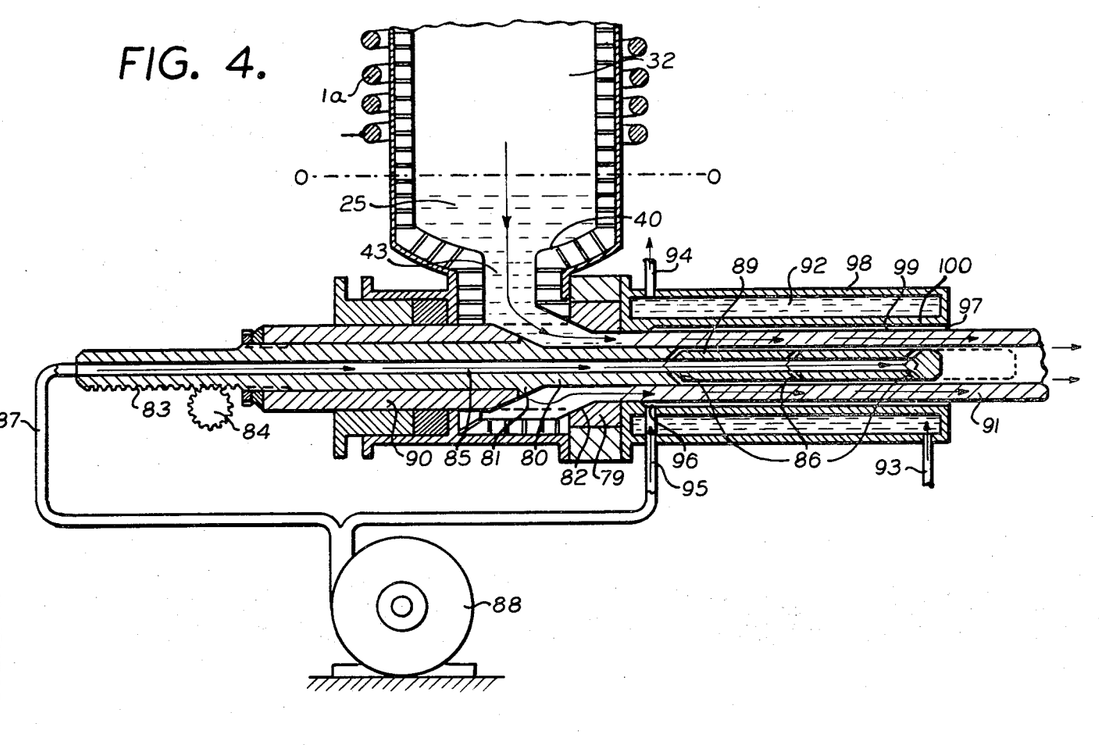
FIG. 4 is an elevation partially in section of another apparatus according to this invention coupled with a metal forming apparatus.

FIG. 4 represents a variation of the continuous casting and forming system of FIG. 3. This apparatus, too, operates in conjunction with a degassing and refining installation according to the invention, as shown in FIG. 2 or FIG. 3. This embodiment shows the combination of the invention of a continuous casting system for pipes, which are cast directly from the vacuum chamber by the falling weight of the molten metal.

The tool system in FIG. 4 consists of a continuous casting die 79 and a continuous casting mandrel 80. The mandrel is provided with a tapered projection 81 and forms with the die 79 an annular gap 82 which is adjustable for gap size. The mandrel is also equipped with a toothed rack 83 which engages a pinion 84 that can be driven in both directions for the purpose of axial displacement of the mandrel 80. In this manner, the size of the annular gap 82 and thus the rate of flow of the molten metal can be regulated. The continuous casting mandrel is furthermore provided with a bore 85 extending substantially over its entire length, and is provided beyond the tapered projection with cross holes 86. The inner periphery of the tubular casting is swept with shielding gas for the prevention of oxidation, through the bore 85 and the holes 86, the gas having been fed through conduit 87, after such has been put under pressure by a compressor 88. The diameter of the continuous casting mandrel is reduced in the area of the holes 86, as shown at 89, to form an annular cross section for the passage of the shielding gas. The mandrel is bedded in a matching mounting 90 made of fireproof material. The casting 91 is surrounded on a portion of its length by a cooling chamber 92 which has an inlet 93 and an outlet 94 for the coolant. The cooling chamber 92 is fed with a liquid, especially water, or with a coolant gas.

To prevent any oxidation of the outside periphery of the tubular strand after it has been forced out of the die 79, a shielding gas which has been compressed by a compressor 88 is fed through the conduit 95. The shielding gas enters at a point 96 which lies approximately in the area where the first radial openings 86 are located. It leaves at point 97 from a chamber 98 which surrounds the tubular strand 91 while forming a gap 99 required for the passage of the shielding gas. The chamber 98 can simultaneously be constructed as the inside wall of a casing 100 which forms the cooling chamber 92.

The tapered projection 81 of the casting mandrel 80 forms a conical valve body capable of cooperating with a matchingly conical valve seat 82 which is formed by the side of the die 79 that faces leftward in FIG. 4. When the machinery is started, the conical valve body 81 is moved rightward in FIG. 4 onto the conical seat 82. After the molten metal has been sufficiently degassed, refined and, if desired, alloyed in the vacuum chamber 32, the valve is opened when the mandrel 80 is moved leftward in FIG. 4 along with the conical valve projection 81. The process of refining the molten metal and of forming a pipe can then be performed continuously.

The heating devices 62 and 63 described with reference to FIG. 3 are particularly expedient for the purpose of keeping the metal liquid if the continuous drawing off of the metal from the vacuum chamber is interrupted. Such interruptions result, for example, as rigging times, when subsequently to the degassing in the vacuum chamber the molten metal is formed into strands or pipes.

All surfaces which come into direct contact with the molten metal are provided in the prior-art manner with brickwork, which, however, has not been especially described in detail.

For the forming of a pipe according to the invention, it is basically necessary only to force the molten metal emerging from the vacuum chamber through an annular continuous casting die by making use of its falling weight. The continuous casting mandrel 80 could also be disposed fixedly. Owing to the fact that, in the embodiment according to FIG. 4, the casting die has been made axially displaceable, it is simultaneously capable of serving as a shut-off device by means of the conical projection 81. If a fixed continuous casting die were provided by the fixed arrangement of the continuous casting mandrel, a separate shut-off device would be additionally provided, corresponding to the shut-off device 71 of the embodiment in FIG. 3.

In the case of a continuous operating installation such as the ones described with reference to FIGS. 2-4, let it be assumed that a period of one minute is necessary for the complete degassing of a molten metal. The vacuum in chambers 3 and 32 is to be 0.1 torr. Let us assume a throughput of 100 kg./min. The height H-4 (FIG. 2) or H-7 (FIG. 3) of the equilibrium line 0—0 above the outlet opening is, let us say, 0.2 m. The molten metal in the vacuum chamber then has a depth of about 1.6 m. This amount of molten metal is to be completely replaced within one minute by an influx of molten metal that has not yet been degassed. To meet this requirement, it is necessary that the contents of the vacuum chamber 3 or 32 amount to 1,000 kg. for a drop of 1.6 m. Under these circumstances, the inside diameter of the vacuum chamber 3 or 32 amounts to only about 0.33 m. If we take the thickness of the brickwork as being 0.15 m., the result is an outside diameter of 0.65 m. for the vacuum chamber. The sealing of a vacuum chamber of such small diameter and the fastening of the brickwork in such a small vacuum chamber are extremely simple. This output, which in itself is quite large, can be still further augmented by increasing the volume of the vacuum chamber, that is, by increasing its diameter, or also by accelerating the through-flow by increasing the height H-4 in FIG. 2 and H-7 in FIG. 3, while correspondingly enlarging the cross-section of the communicating passage 33.

Similarly favorable conditions are obtained in the case of the embodiment in FIG. 1.

The embodiments shown in FIGS. 2 to 4 of the apparatus for the performance of the continuous degassing and refining process of the invention can all be used for the degassing and refinement of the molten metals from a plurality of furnaces. Gases such as air, active and/or neutral, are used in a prior-art manner as the purge gas in the process according to the invention.

In each of the figures of the drawings, there is indicated to be an induction coil 1a, operatively associated with the vacuum chamber of each embodiment. While the presence of this coil is preferred, it may be dispensed with where short duration degasification is to be accomplished.

The special advantage of the process of the invention consists, in addition to the better and more rapid degassing and refinement of the molten metal and the ability to heat during such vacuum treatment, in the capability of the process to run continuously or, in case of the embodiment in FIG. 1, semi-continuously, to be independent from the height of the barometric column by using overpressure for material transport, and in the considerable reduction in the size and cost of the apparatus for the performance of this process.

Non-metallic raw materials can also be degassed or reduced, as the case may be, and alloyed in this manner.

What is claimed is:

1. Apparatus for treating molten metal comprising a first vessel having a first opening formed adjacent its lower end and a molten metal receiving tube extending generally downwardly from said first opening, a second vessel for receiving a quantity of molten metal and having a second opening formed adjacent its lower end and a molten metal discharge tube extending generally downwardly from said second opening, passage means coupled in a sealed relation to each of said tubes for interconnecting the same, said second vessel being disposed with its second opening in an elevated position with respect to a substantial portion of the receiving tube to produce a gravity flow of a first quantity of molten metal from said second vessel to a substantial height within said receiving tube and adjacent to said first opening, and evacuating means coupled to said first vessel for subjecting the same to a subatmospheric pressure sufficient to draw a quantity of molten metal through said receiving tube from said second vessel and into said first vessel.

2. The apparatus set forth in claim 1 wherein said first and second vessels are disposed in substantial horizontal alignment.

3. The apparatus set forth in claim 2 wherein said first vessel also has a discharge outlet adjacent its lower end and spaced from said first opening to permit the discharge of molten metal from said first vessel.

4. The apparatus set forth in claim 3 and including continuous casting means coupled to said outlet.

5. Apparatus as claimed in claim 1, wherein heating means are disposed about portions of said apparatus.

6. The apparatus set forth in claim 1 wherein said second vessel is open at its upper end for receiving molten metal and is disposed in substantial horizontal alignment with said first vessel.

7. The apparatus set forth in claim 6 wherein said tubes and passage means comprises a substantially U-shaped structure extending downwardly from the lower ends of each of said vessels.

8. The apparatus set forth in claim 7 wherein said receiving tube extends above the lower end of said first vessel, and a discharge opening is formed in the lower end of said first vessel wherein molten metal entering said first vessel through said receiving tube will circulate through said first vessel prior to discharge from said discharge opening.

9. The apparatus set forth in claim 8 and including the continuous casting apparatus coupled to said discharge opening.

10. The apparatus set forth in claim 9 wherein induction heating means is disposed about said first vessel.

11. The apparatus set forth in claim 1 and including means for introducing a gas into said receiving tube.

References Cited

UNITED STATES PATENTS

| | | | |
|---|---|---|---|
| 2,893,715 | 7/1959 | Harders et al. | 266—34 |
| 3,022,059 | 2/1962 | Harders | 266—34 |
| 3,042,510 | 7/1962 | Armbruster et al. | 266—34 |
| 3,084,038 | 4/1963 | Finkl | 266—34 |
| 3,125,440 | 3/1964 | Hornak et al. | 266—34 |
| 3,145,095 | 8/1964 | Franzen | 266—34 |
| 3,154,404 | 10/1964 | Lorenz | 266—34 |
| 3,116,999 | 1/1964 | Armbruster | 266—34 |
| 3,310,850 | 3/1967 | Armbruster | 22—73 |
| 1,921,060 | 8/1933 | Williams | 266—34 |
| 2,859,262 | 11/1958 | Harders | 266—34 |

FOREIGN PATENTS

| | | | |
|---|---|---|---|
| 1,372,527 | 8/1964 | France | 266—34 |

GERALD A. DOST, Primary Examiner

U.S. Cl. X.R.

75—49